US012594786B2

(12) United States Patent
Balbach et al.

(10) Patent No.: US 12,594,786 B2
(45) Date of Patent: Apr. 7, 2026

(54) SPLIT TORSION AXLE FOR TRAILERS AND OTHER VEHICLES

(71) Applicant: Voyager Industries, Inc., Brandon, MN (US)

(72) Inventors: Trevor Balbach, Henning, MN (US); Christopher Vanderweyst, Alexandria, MN (US); Gary Suckow, Evansville, MN (US)

(73) Assignee: Voyager Industries, Inc., Brandon, MN (US)

( * ) Notice: Subject to any disclaimer, the term of this patent is extended or adjusted under 35 U.S.C. 154(b) by 730 days.

(21) Appl. No.: 17/822,113

(22) Filed: Aug. 24, 2022

(65) Prior Publication Data

US 2024/0066921 A1 Feb. 29, 2024

(51) Int. Cl.
B60B 35/14 (2006.01)
B60B 35/18 (2006.01)

(52) U.S. Cl.
CPC .............. B60B 35/14 (2013.01); B60B 35/18 (2013.01); *B60B 2310/306* (2013.01); *B60B 2380/14* (2013.01); *B60B 2380/90* (2013.01); *B60B 2900/313* (2013.01)

(58) Field of Classification Search
CPC ......... B60B 35/00; B60B 35/04; B60B 35/06; B60B 35/08; B60B 35/14; B60B 35/18; B60B 2310/306; B60B 2380/14; B60B 2380/90; B60B 2900/313; B60B 37/08; B60G 11/00; B60G 11/225; B60G 21/05; B60G 21/051

USPC ........... 301/124.1; 280/124.13, 137, 156, 43, 280/248
See application file for complete search history.

(56) References Cited

U.S. PATENT DOCUMENTS 427,816 A * 5/1890 Wolfe et al. ............ B60B 35/04
295/39
618,200 A * 1/1899 Denney ................... B60B 35/04
295/39

(Continued)

FOREIGN PATENT DOCUMENTS

FR 2591538 A1 * 6/1987 ............. B60B 37/08
WO WO-2017214506 A1 * 12/2017 ......... B60B 27/0047

*Primary Examiner* — S. Joseph Morano
*Assistant Examiner* — Eva L Comino
(74) *Attorney, Agent, or Firm* — Craig J. Lervick; Larkin Hoffman Daly & Lindgren, Ltd.

(57) ABSTRACT

A split torsion axle is configured to provide the advantages of a torsion axle while also allowing for the independent adjustment of related wheel assemblies positioned on opposite ends thereof. The split torsion axle also provides for additional stability provided by having a continuous axle member spanning the width of the trailer or vehicle upon which the split torsion axle is deployed. To provide these capabilities, the split torsion axle comprises a first torsion axle beam and a second torsion axle beam, which are rotatably coupled to one another by a central joint. The central joint comprises a first spindle coupled to the first torsion axle beam, a second spindle coupled to the second axle beam, and a bearing assembly rotatably coupling the first and second spindles to one another. Both the first torsion axle beam and the second torsion axle beam are configured to be coupled to respective wheel assemblies.

15 Claims, 6 Drawing Sheets

(56)           References Cited

U.S. PATENT DOCUMENTS

| | | | | |
|---|---|---|---|---|
| 778,299 | A * | 12/1904 | Bayard | B60B 35/04 |
| | | | | 295/39 |
| 977,002 | A * | 11/1910 | Girt | B60B 35/14 |
| | | | | 295/38 |
| 1,590,861 | A * | 6/1926 | Scribner | B60B 35/14 |
| | | | | 295/44 |
| 3,535,002 | A * | 10/1970 | Stamm | B60B 35/16 |
| | | | | 301/124.1 |
| 5,163,701 | A * | 11/1992 | Cromley, Jr. | B60G 11/185 |
| | | | | 280/124.13 |
| 5,263,736 | A * | 11/1993 | Stevens | B60G 3/14 |
| | | | | 280/124.13 |
| 5,411,287 | A * | 5/1995 | Henschen | B60G 11/183 |
| | | | | 267/276 |
| 6,447,073 | B1 * | 9/2002 | Goettker | B60B 35/06 |
| | | | | 267/276 |
| 6,923,452 | B1 * | 8/2005 | Zachmeier | B60P 1/027 |
| | | | | 280/6.151 |
| 8,191,911 | B1 * | 6/2012 | Reynolds | B60G 3/20 |
| | | | | 280/124.13 |
| 8,573,621 | B1 * | 11/2013 | Reynolds | B60G 11/225 |
| | | | | 280/124.13 |
| 8,727,363 | B1 | 5/2014 | VanDenberg et al. | |
| 2010/0253029 | A1 * | 10/2010 | Blough | A01F 15/08 |
| | | | | 280/124.116 |
| 2017/0297404 | A1 | 10/2017 | Goettker | |
| 2018/0162163 | A1 * | 6/2018 | Dombroski | B60B 35/004 |
| 2019/0162163 | A1 * | 5/2019 | Espinosa | H02K 35/04 |
| 2021/0178954 | A1 | 6/2021 | Reid | |
| 2022/0055404 | A1 | 2/2022 | Granger et al. | |

* cited by examiner

SECTION 8-8

SPLIT TORSION AXLE FOR TRAILERS AND OTHER VEHICLES

BACKGROUND

When dealing with various vehicles, and particularly utility trailers, it is occasionally necessary or desired to raise and lower the height of the trailer using various axle assemblies. Further, there is always a need to provide users with flexibility and options regarding how this raising, lowering and/or adjustment is completed.

In many applications, the use of a torsion axle is beneficial, as it provides shock absorbing capabilities in a self-contained structure. Torsion axles naturally eliminate the need for leaf springs or other suspension components in many circumstances. Other advantages are well known in the industry. As such, torsion axles have been widely accepted and are used in multiple applications, including trailers of many different types.

In some circumstances, especially when using trailers of different types, it is desired to lower or adjust wheel assemblies separately, due to uneven terrain, specific unloading or loading requirements, etc. This creates challenges since most torsion axle assemblies simply allow for overall adjustment of the entire axle assembly itself, and do not provide the ability for individual adjustment of each wheel. Alternatively, in those situations where two separate wheel assemblies are utilized on each side of the trailer, any strength and/or stability provided by a continuous cross-axle member is lost. As such, additional components are required to sufficiently support the trailer framework and provide the desired stability, thereby adding to the complexity of the trailer itself.

SUMMARY

To provide additional capabilities to users when positioning or adjustment trailers or other vehicles, and to maintain desired levels of strength and stability to a trailer or vehicle, a unique split torsion axle system is included. Due to the design and configuration of this split torsion axle system, each wheel or side of the related trailer or vehicle can be lowered or adjusted independently, thus providing the ability to deal with uneven terrain or unique situations.

In one embodiment, the split torsion axle system includes a first torsion axle beam and a second torsion axle beam which are substantially linear and configured to be attached to a first wheel assembly and a second wheel assembly, respectively. The first torsion axle beam and the second torsion axle beam are coupled to one another using a central joint which keeps the first torsion axle beam and the second torsion axle beam in substantially linear alignment, while also providing relative rotation between these two components. The central joint itself is configured with a first spindle which is coupled to the first torsion axle beam, a second spindle which is coupled to the second torsion axle beam and a bearing assembly which rotatably couples the first spindle to the second spindle. The bearing assembly is more specifically configured with a hub that is coupled to the first spindle and a bearing or bearings situated within the hub. The bearings are operatively coupled to an extending portion of the second spindle. This hub and bearing configuration maintains substantial linear alignment between the components, while also accommodating rotational capabilities and continued strength. When used, this split torsion axle provides the needed adjustability, while also providing stability and strength to the trailer.

BRIEF DESCRIPTION OF THE DRAWINGS

Several advantages and features of the various embodiments are set forth in the following description, in conjunction with the drawings, in which.

DESCRIPTION

Figure 1:
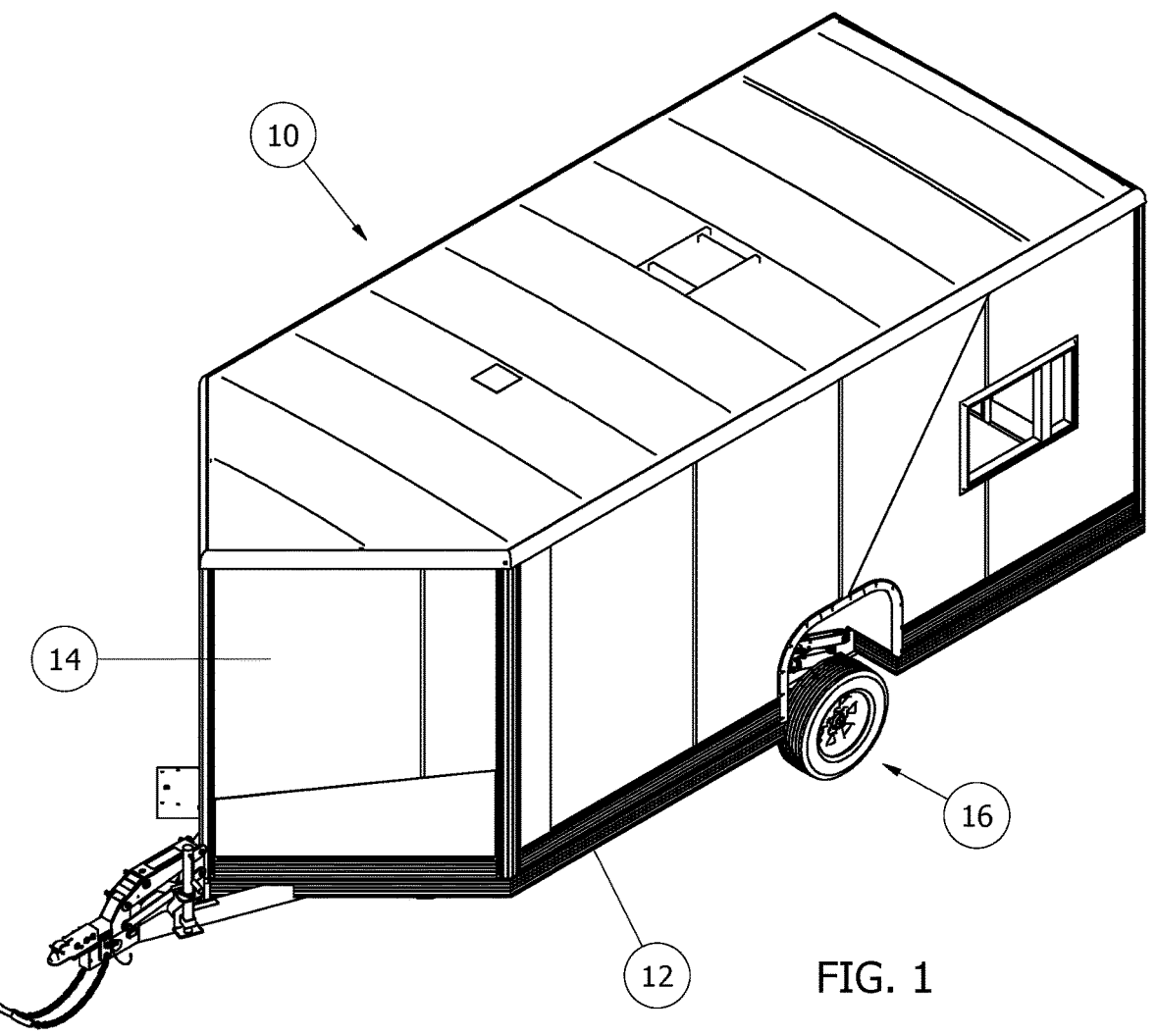
FIG. 1 presents a perspective view of a trailer that makes use of the split torsion axle.

Described below are further details of a split torsion axle 20, as applied to a utility trailer 10. Although one embodiment of the split torsion axle is described, it will be understood by those skilled in the art that many variations could exist, and different applications are possible. Turning now to FIG. 1, a perspective view of utility trailer 10 is illustrated, which includes a supporting framework 12, a main housing 14 (or main body 14), and a first wheel assembly 16 and a second wheel assembly 18 (not shown in FIG. 1). In this embodiment, it is anticipated that utility trailer 10 is configured as a fish house or similar utility trailer, however, several different applications are equally possible. For example, this could be applicable to a recreational vehicle, a camper, a flatbed trailer, a vending trailer, or several other types of trailers. Additionally, this could be utilized as a portion of a standalone vehicle, although most likely would involve non-drive wheels. That said, certain options or variations could easily be contemplated or adapted for different uses.

Figures 2, 3, 4:
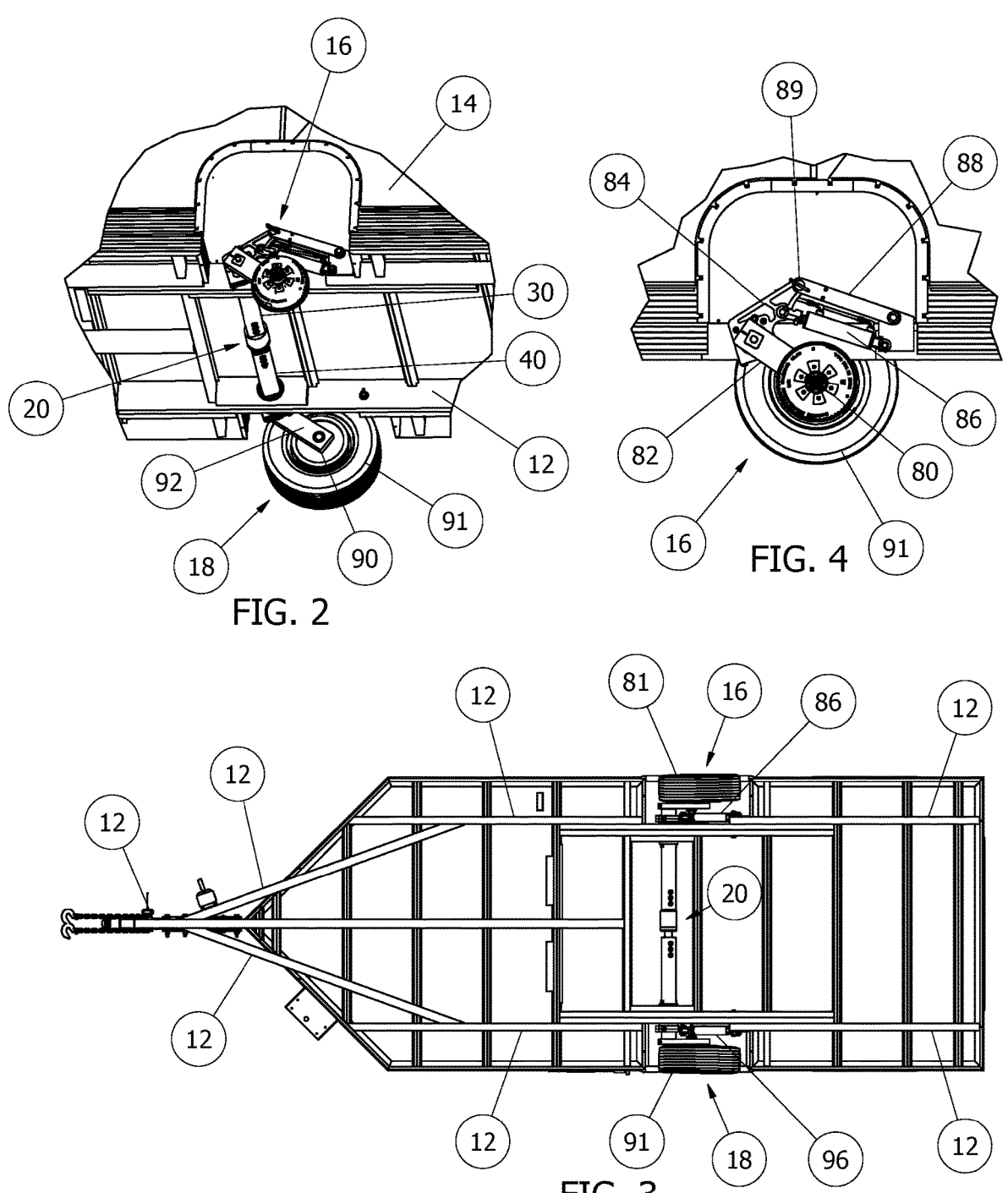
FIG. 2 is a close-up bottom perspective view of the trailer illustrated in FIG. 1, which illustrates one embodiment of the split torsion axle in use.
FIG. 3 shows a bottom view of the trailer illustrated in FIG. 1.
FIG. 4 is a side view of a wheel assembly.

Referring to FIGS. 2 and 3, a bottom portion of trailer 10 is seen. In these figures, split torsion axle 20 is shown in context. As will be apparent from FIGS. 2 and 3, supporting framework 12 can include several components, including various cross members and lateral support members, all joined and configured to create a supporting floor. Further, it should be noted that FIG. 2 includes wheel assemblies 16 and 18, with one wheel removed, while FIG. 3 includes first wheel assembly 16 and second wheel assembly 18, both having respective wheels 81 and 91, in place.

Figures 5, 6, 7, 8:
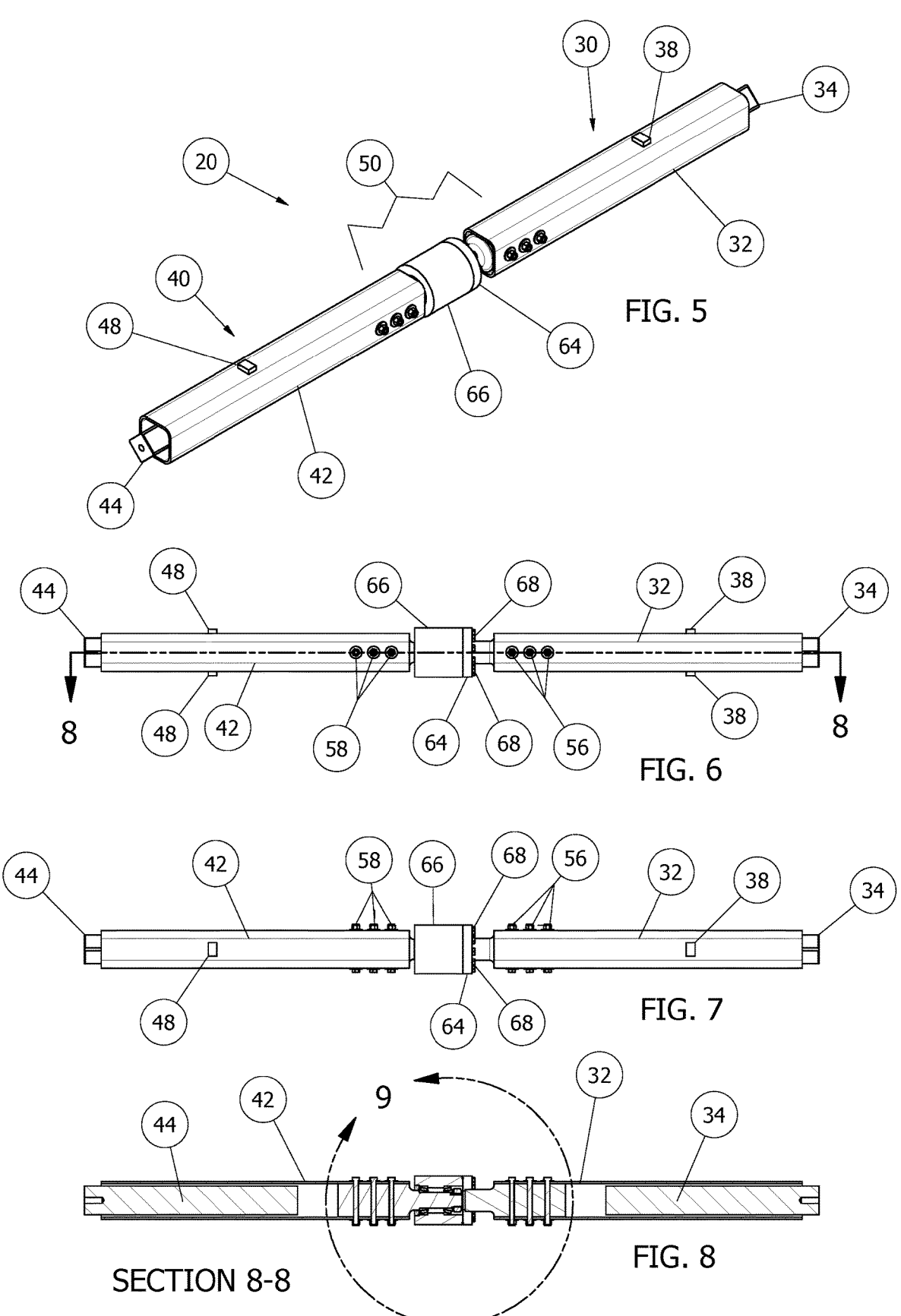
FIG. 5 is a perspective view of the split torsion axle.
FIG. 6 is a side view of the split torsion axle.
FIG. 7 shows a top view of the split torsion axle.
FIG. 8 presents a cross section of the split torsion axle.

Referring now to FIG. 5, a perspective view of split torsion axle 20 is presented. In this embodiment, split torsion axle 20 includes a first axle beam 30, a second axle beam 40, and a central joint 50. Further details regarding these components are set forth below, however, it will be understood that first axle beam 30 and second axle beam 40 are generally configured to function as torsion axle assemblies. As shown, first axle beam 30 and second axle beam 40 are both substantially linear components and configured in a manner to maintain this shape during use. Further, central joint 50 is configured so that the overall split torsion axle (i.e. first axle beam 30, second axle beam 40, and central joint 50) is configured in a substantially linear overall configuration and is designed with enough strength to maintain this configuration and to provide support for trailer 10.

In more detail, first axle beam 30 will include an outer housing or outer tube 32, which cooperates with an inner axle member 34, and a resilient member 36 (shown in FIG. 10) which supports and controls relative movement of outer housing 32 with respect to inner axle member 34. Similarly, second axle beam 40 also includes an outer housing or outer tube 42, an inner axle member 44, and at least one resilient member 46 (not shown in the FIGS) contained within outer tube 42. As will be discussed in further detail below, outer housing 32 of first axle beam 30 and outer housing 42 of second axle beam 40 are coupled to a first torsion clamp arm 84 and a second torsion clamp arm 94, which are included as part of both first wheel assembly 16 and second wheel assembly 18, respectively. More specifically, outer housing 32 of first axle beam 30 is coupled to first torsion clamp arm 84 of first wheel assembly, while outer housing 42 of second axle beam 40 is coupled to second torsion claim arm 94 of second wheel assembly 18. As will be recognized and further described below, inner axle members 34 and 44 will both be coupled to a swing arm of the first wheel assembly 16 and second wheel assembly 18, respectively. In this manner, split torsion axle 20 will allow the first wheel assembly 16 and second wheel assembly 18 to take advantage of the features and advantages of torsion axles, when incorporated into suspension structures of trailer 10.

Figure 9:
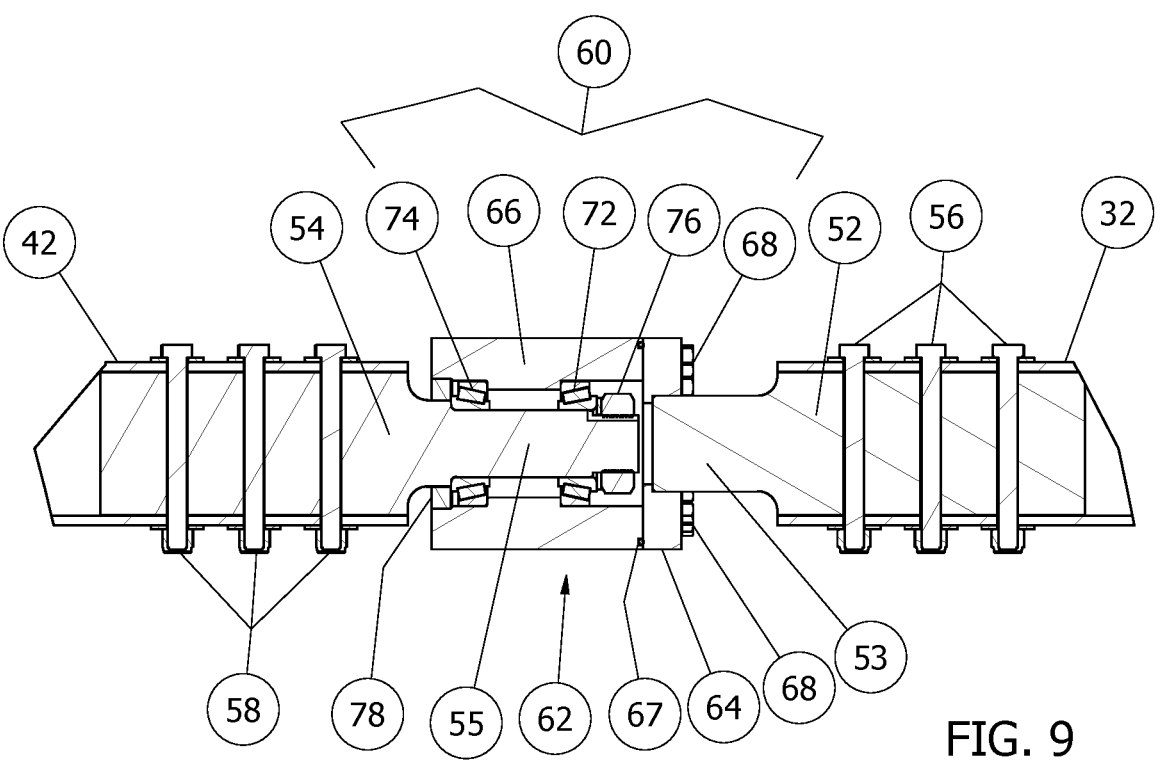
FIG. 9 shows an isolated cross section of a central bearing assembly.
Figure 10:
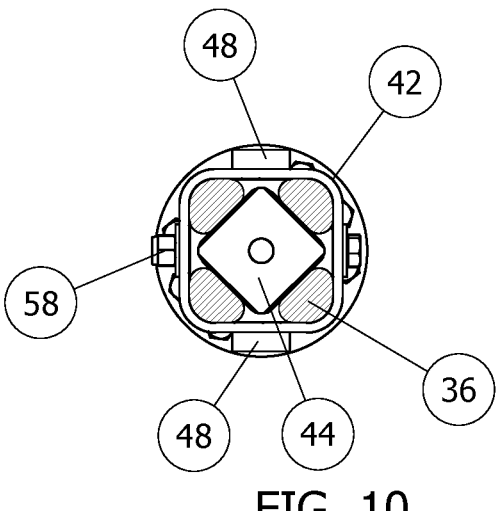
FIG. 10 provides an end view of the split torsion axle.

Turning now to FIGS. 6-10, additional details regarding split torsion axle 20, and specifically central joint 50, are better illustrated. FIGS. 6 and 7 show top and side views of the split torsion axle. Both FIGS. 8 and 9 illustrate a cross-sectional view of split torsion axle 20, along section lines 8-8 shown in FIG. 6, with FIG. 9 being a close-up view better showing the components making up central joint 50. FIG. 10 is an end view of split torsion axle 20, better illustrating portions of second axle beam 40, including outer housing/tube 42 and inner axle member 44 resilient member 46.

Turning now more specifically to FIG. 9, details of the central joint 50 are better illustrated. More specifically, central joint 50 further includes a first spindle 52, a second spindle 54, and a bearing assembly 60. In this embodiment, first spindle 52 is connected to outer housing 32 of first axle beam 30 using a plurality of connecting bolts 56, while second spindle 54 is connected to outer housing 42 of second axle beam 40 using a second plurality of connecting bolts 58.

As another part of central joint 50, and specifically a component of bearing assembly 60, a center pivot hub 62 is designed and configured to cooperate with various portions of first spindle 52 and second spindle 54 to allow for rotation, while also providing stability. As specifically illustrated, center pivot hub 62 includes an end cap 64 and a cylindrical bearing housing 66 which are uniquely configured to function as a portion of center pivot hub 62. End cap 64 is specifically designed to connect to bearing housing 66 using a plurality of connection bolt 68, which are best seen in FIGS. 6-9. Those skilled in the art will recognize that connection bolts 68 will pass through holes in end cap 64 and connect with threaded openings in bearing housing 66. An O-ring 67 is also positioned within a groove in bearing housing 66 to create a sealed connection between bearing housing 66 and end cap 64.

Referring again to FIG. 9, an extending portion 53 of first spindle 52 is coupled to end cap 64, thereby causing center pivot hub 62 to move in conjunction with first spindle 52. In this embodiment, these two elements (extending portion 53 and end cap 64) are welded to one another to form a unitary part. Similar structures could be formed through machining, bonding, casting, etc. As also illustrated in FIG. 9, bearing housing 66 includes internal ridges to contain a first bearing 72 and a second bearing 74. A cooperating portion of first bearing 72 and second bearing 74 are coupled to an extending portion 55 of second spindle 54. Also coupled to extending portion 55 of second spindle 54 is a retaining nut 76, which will help contain second spindle 54 in position, and to retain first bearing 72. Also coupled between extending portion 55 of second spindle 54 and bearing housing 66 is a bearing seal 78. As will be recognized, these various components and structures allow for second spindle 54 to independently rotate within bearing housing 66, while also maintaining alignment. Further, since first spindle 52 is connected to center pivot hub 62, this structure allows for the previously discussed relative rotation between first spindle 52 and second spindle 54. Similarly, this provides or allows first axle beam 30 to independently rotate with respect to second axle beam 40. As will be appreciated, this provides several features and advantages not available with typical torsion axle structures. Further, these features allow for the above-mentioned rotation, while also providing a significant level of stability and rigidity along the length of split torsion axle 20.

Figure 11:
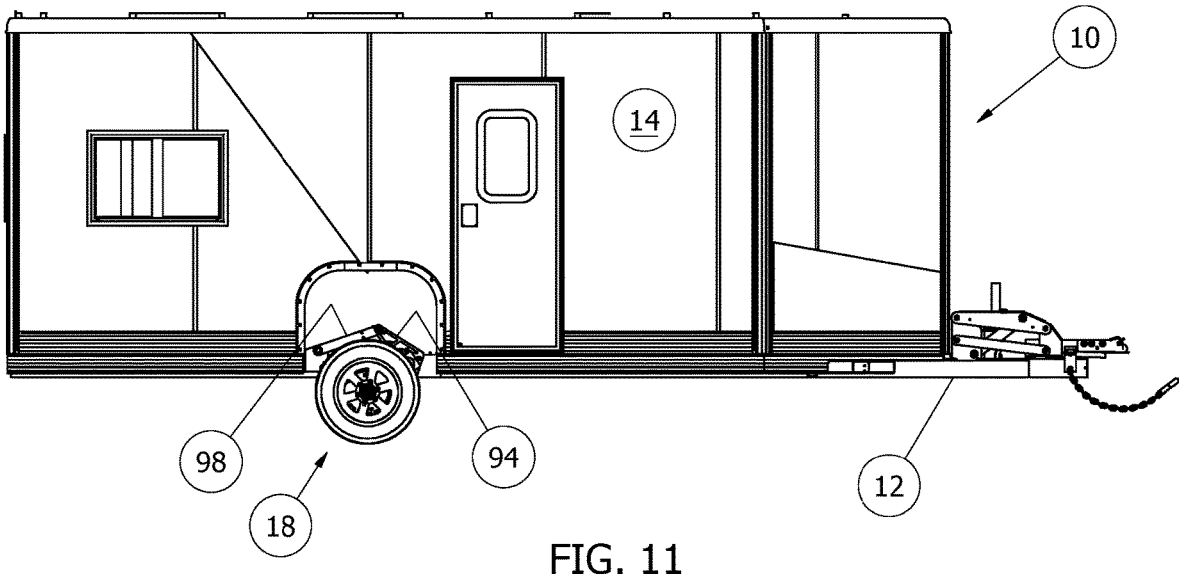
FIG. 11 is a side view of the trailer.
Figure 12:
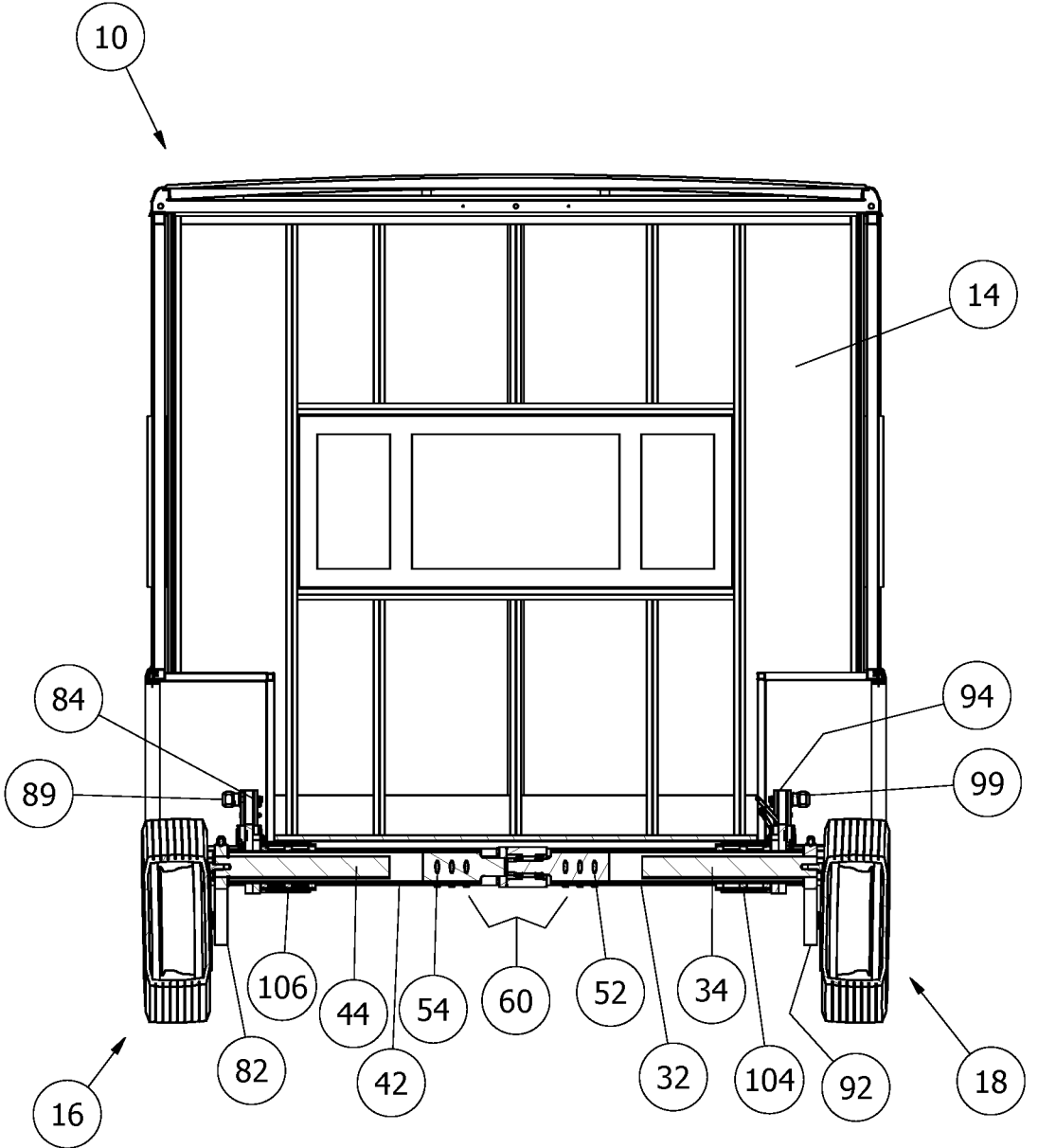
FIG. 12 illustrates a cross-sectional view of the split torsion axle as installed on a trailer.

To provide additional context, FIG. 11 shows a side view of a trailer having split torsion axle 20 installed thereon and FIG. 12 illustrates a cross-sectional view of split torsion axle 20, as utilized in a utility trailer 10. Also, FIG. 4 presents a more detailed view of first wheel assembly 16 (which is also shown in FIGS. 11-12). Referring now specifically to FIG. 4, first wheel assembly 16 includes a wheel hub or brake drum hub 80, which is configured to be attached to a wheel (not shown), while also providing braking functions. Wheel hub 80 is rotatably coupled to a swing arm 82 at a first end thereof. An opposite end of swing arm 82 is coupled inner axle member 34 of first axle beam 30. This configuration will allow for the advantages of a torsion axle to be exploited. As will be recognized, the use of resilient member 36, cooperating between inner axle member 34, an outer housing/tube 32 will allow for shock absorbing and related suspension functions.

As also shown in FIG. 4, a torsion clamp arm 84 is also included as part of first wheel assembly 16. Torsion clamp arm 84 will be coupled to outer housing/tube 32 of split torsion axle 20 and provides the ability to adjust the height of trailer 10. In this embodiment, a cylinder 86 cooperates with torsion clamp arm 84, to allow for the automated adjustment of wheel heights. To provide additional stability, when the wheel height is in a "transport position," a lock arm 88 is used to lock torsion clamp arm 84 in a locked position. For example, this locked position will typically be used when trailer 10 is being towed at higher speeds. To provide for convenient adjustments, a hitch pin 89 is included, which when removed will decouple lock arm 88 from torsion clamp arm 84. Similar structures could be used to lock the wheel assembly at various heights. Those skilled in the art will recognize that this will allow for appropriate movement and adjustment of trailer height in a convenient and flexible manner. Stated differently, this will allow for adjustment of the horizontal positioning of the wheels relative to trailer framework 12.

As will be appreciated, second wheel assembly 18 will have similar structures and will operate the same as first wheel assembly 16. As partially illustrated in FIGS. 2 & 12, second wheel assembly 18 will also have a second wheel hub or second brake drum hub 90 to support a related wheel 91. Second wheel hub 90 will be coupled to a second swing arm 92 at one end thereof. Second swing arm 92 is coupled at an opposite end to inner axle member 44 of second axle beam 40. A second torsion clamp arm 94 will be coupled to the outer housing 42 of second axle beam to allow for controlled rotation of second axle beam 40 relative to the trailer. A second cylinder 96 and second lock arm 98 (not shown in FIGS. 2 & 12) will allow for moving and locking second torsion clamp arm 94.

Referring again to FIG. 12, additional details regarding the use of split torsion axle 20 are illustrated, specifically including the way it is coupled to other portions of supporting framework 12. As will be recognized, when split torsion axle 20 is coupled to trailer 10, continued rotational capabilities will be required. To achieve this, a first carrier axle bearing 104 and a second carrier axle bearing 106 are utilized. Both first carrier axle bearing 104 and second carrier axle bearing 106 will each have an internal bearing surface (not specifically shown) coupled to first axle beam 30 and second axle beam 40, respectively. To aid in this coupling, a first set of axle tabs 38 extending from opposite side surfaces of first axle outer housing 32 will mate with related structures on the internal bearing surface of first carrier axle bearing 104. Similarly, a second set of axle tabs 48 extending from opposite surfaces of second axle outer housing 42 will mate with structures on the internal bearing surface of second carrier axle bearing 106. First set of axle tabs 38 and second set of axle tabs 48 are best illustrated in FIGS. 5-7. As generally discussed above, split torsion axle 20 is retained by first torsion clamp arm 84 and second torsion clamp arm 94. Similarly, first carrier axle bearing 104 and second carrier axle bearing 106 are coupled to split torsion axle 20 by first axle tabs 38 and second axle tabs 48, respectively.

First carrier axle bearing 104 and second carrier axle bearing 106 will also have an outer surface which is coupled to supporting framework 12 of utility trailer 10. As will be recognized, the use of first carrier axle bearing 104 and second carrier axle bearing 106 will allow for the above-mentioned rotation and wheel adjustment functions, while also providing additional support and rigidity for utility trailer 10. Again, the use of this coupling structure, along with the rotatable central joint 50, allows for the ability to independently adjust either side of the utility trailer 10, as needed.

In the embodiments discussed above, trailer 10 makes use one pair of wheels which take advantage of split torsion axle 20. It is equally possible to have multiple axles on a trailer which could also make use of multiple split torsion axles. Independent lowering and raising the level of the trailer would still be possible since each wheel assembly could be independently adjusted.

As will be appreciated, various alternative embodiments are possible, to achieve similar functions and to take advantage of the features commonly exploited by torsion axles. As one example, the specific structure of central joint 50 could easily be configured differently, while utilizing the same principles discussed above.

Various embodiments have been described above for purposes of illustrating the details thereof and to enable one of ordinary skill in the art to make and use the split torsion axle. The details and features of the disclosed embodiment

[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A split torsion axle configured to be coupled to a vehicle, comprising:

a first torsion axle beam and a second torsion axle beam, wherein the first torsion axle beam and the second torsion axle beam are substantially linear and are each configured to be coupled to the vehicle and are also configured for coupling to a first wheel assembly and a second wheel assembly, respectively, and wherein the first wheel assembly supports a first wheel in a position where an axis of rotation for the first wheel is not aligned with the linear first torsion axle beam and second torsion axle beam, and the second wheel assembly supports a second wheel in a position where an axis of rotation for the second wheel is not aligned with the linear first torsion axle beam and second torsion axle beam; and a central joint rotatably coupling the first torsion axle beam to the second torsion axle beam, the central joint comprising:

a first spindle coupled to the first torsion axle beam;

a second spindle coupled to the second torsion axle beam; and a bearing assembly rotatably coupling the first spindle to the second spindle, wherein the bearing assembly is further configured to maintain substantially linear alignment of the first torsion axle beam and the second torsion axle beam while also allowing the first torsion axle beam and the second torsion axle beam to rotate with respect to one another.

2. The split torsion axle of claim 1 wherein the first torsion axle beam further comprises a first outer tube which is configured to be coupled to a frame portion of the vehicle, a first axle member contained within at least a portion of the first outer tube and configured to be operatively coupled to the first wheel assembly and a first resilient member contained within the first outer tube and surrounding the first axle member, the first resilient member configured to allow controlled movement between the first outer tube and the first axle member;

wherein the second torsion axle beam each further comprises a second outer tube which is configured to be coupled to the frame portion of the vehicle, a second axle member contained within at least a portion of the second outer tube and configured to be operatively coupled to the second wheel assembly, and a second resilient member contained within the second outer tube and surrounding the second axle member, the second resilient member configured to allow controlled movement between the second outer tube and the second axle member; and wherein the first outer tube and the second outer tube are coupled to the central joint thereby allowing the rotation of the first torsion axle beam and the second torsion axle beam relative to one another.

3. The split torsion axle of claim 1 wherein the bearing assembly comprises a hub coupled to the first spindle, and a bearing situated between the hub and an extending portion of the second spindle, wherein the hub is further configured to surround the extending portion of the second spindle, and wherein the bearing is situated within the hub.

4. The split torsion axle of claim 3 further comprising a second bearing coupled to the hub and the extending portion of the second spindle to further support the rotatable coupling of the first torsion axle beam to the second torsion axle beam.

5. The split torsion axle of claim 4 wherein the hub has a cylindrical bearing housing and an end cap coupled thereto, the end cap further coupled to the first spindle and forming a first closed end for the hub, and wherein the hub further has a bearing seal coupled to the bearing housing at an end which is opposite the end cap, the bearing seal configured to allow an extending portion of the second spindle to pass therethrough.

6. The split torsion axle of claim 1 wherein the vehicle is a trailer, and wherein the first torsion axle beam is configured to be operatively coupled to a first wheel assembly of the trailer, and the second torsion axle beam is configured to be coupled to a second wheel assembly of the trailer, and wherein the first wheel assembly and the second wheel assembly are configured to be adjustable independently from one another.

7. The split torsion axle of claim 6 further comprising a first carrier axle bearing rotatably coupling the first torsion axle beam to the trailer and a second carrier axle bearing rotatably coupling the second torsion axle beam to the trailer.

8. The split torsion axle of claim 7 wherein the first torsion axle beam comprises a first outer tube coupled to the first carrier axle bearing and a first inner axle member coupled to the first wheel assembly, and wherein the second torsion axle beam comprises a second outer tube coupled to the second carrier axle bearing and a second inner axle member coupled to the second wheel assembly.

9. The split torsion axle of claim 8 wherein the first outer tube surrounds a first resilient member and the first resilient member surrounds the first inner axle member and wherein second outer tube surrounds a second resilient member and the second resilient member surrounds the second inner axle member; and wherein the first resilient member allows for dampened movement of the first inner axle member relative to the first outer tube and the second resilient member allows for dampened movement of the second inner axle member relative to the second outer tube.

10. A trailer, comprising:

a trailer framework having an upper support surface;

a first wheel assembly having a first swing arm and a first torsion clamp arm, wherein the first swing arm is configured to support a first wheel at a first end thereof;

a second wheel assembly having a second swing arm and a second torsional clamp arm, wherein the second swing arm is configured to support a second wheel at a first end thereof; and a split torsion axle comprising a first axle beam, a second axle beam and a central joint rotatably coupling the first axle beam to the second axle beam, wherein the first axle beam and the second axle beam are rotatably coupled to the framework via a first torsion clamp arm and a second torsion claim arm, respectively, and wherein a first inner axle member of the first axle beam is coupled to a second end of the first swing arm such that rotation of the first axle beam will cause rotation of the first swing arm, and wherein a second inner axle member of the second axle beam is coupled to a second end of the second swing arm such that rotation of the second axle beam will cause rotation of the second swing arm, wherein rotation of the first torsion clamp arm causes an adjustment of a horizontal position of the first wheel relative to the upper support surface due to related rotation of the first swing arm and rotation of the second torsion clamp arm causes an adjustment of a horizontal position of second wheel relative to the upper support surface due to related rotation of the second swing arm, and wherein adjustment of the horizontal position of the first wheel relative to the upper support surface and adjustment of the horizontal position of the second wheel relative to the support surface can be achieved independently.

11. The trailer of claim 10 wherein the central joint rotatably coupling the first axle beam to the second axle beam further comprises:

a first spindle coupled to the first axle beam;

a second spindle coupled to the second axle beam; and a bearing assembly rotatably coupling the first spindle to the second spindle, wherein the bearing assembly is further configured to maintain substantially linear alignment of the first torsion axle beam and the second torsion axle beam.

12. The trailer of claim 11 wherein the bearing assembly comprises a hub coupled to the first spindle, and a bearing situated between the hub and an extending portion of the second spindle, wherein the hub is further configured to surround the extending portion of the second spindle, and wherein the bearing is situated within the hub.

13. The trailer of claim 12 wherein split torsion axle is substantially linear and maintains a substantially linear configuration during use.

14. The trailer of claim 13 wherein:

the first axle beam comprises a first outer tube surrounding the first inner axle member and a first torsion member positioned between the first inner axle member and the first outer tube to provide controlled resistance to rotation of the first inner axle member relative to the first outer tube; and the second axle beam comprises a second outer tube surrounding the second inner axle member and a second torsion member positioned between the second inner axle member and the second outer tube to provide controlled resistance to rotation of the first inner axle member relative to the first outer tube.

15. The trailer of claim 14 wherein the first inner axle member and the second inner axle member are both have a cross section that is substantially square and both have four sides, and wherein the first torsion member is made up of four resilient elements, with each one of the four resilient elements of the first torsion member positioned in contact with a respective one of the four sides of the first inner axle member and in contact with an inner wall of the first outer tube to thereby resist rotation of the first inner axle member with respect to the first outer tube, and wherein second torsion member is made up of four resilient elements, with each one of the four resilient element of the second torsion member being positioned in contact with one of the four sides of the second inner axle member and in contact with an inner wall of the second outer tube to thereby resist rotation of the second inner axle member with respect to the second outer tube.

\* \* \* \* \*